United States Patent Office 3,451,564
Patented June 24, 1969

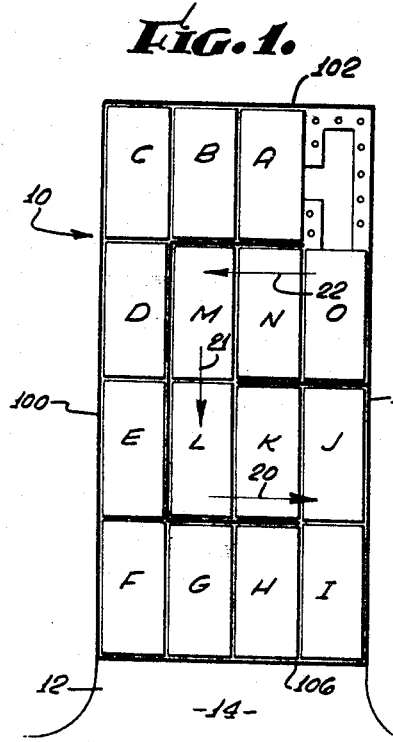

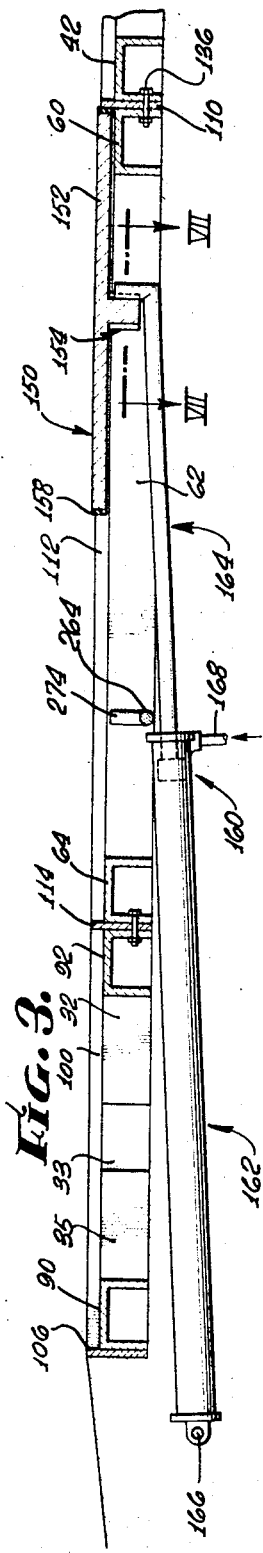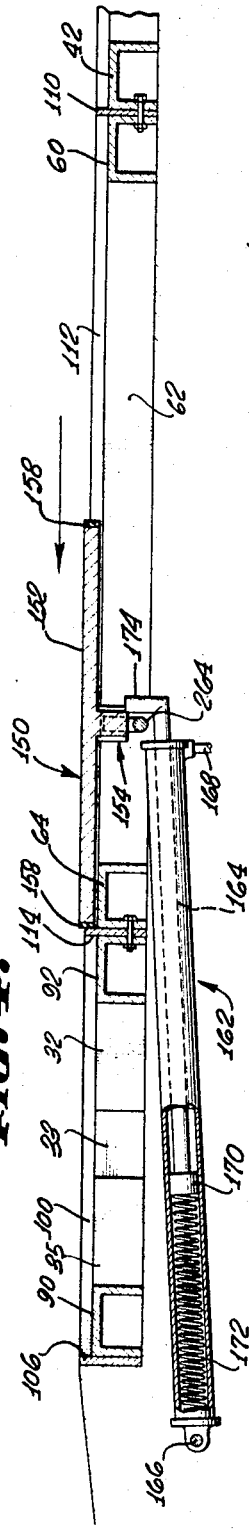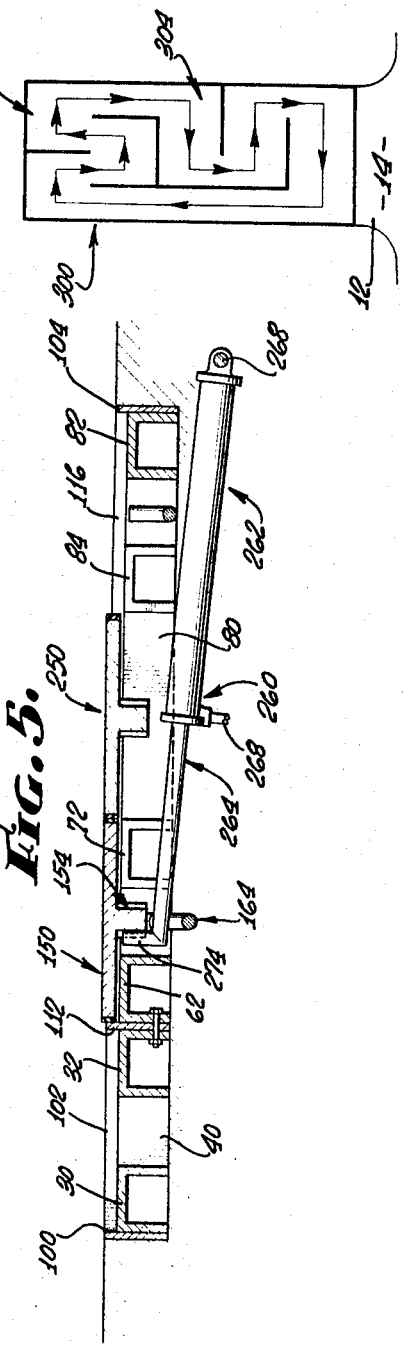

3,451,564
AUTOMOBILE PARKING SYSTEM
Wendall M. B. Haas, 19204 Casad Ave.,
Covina, Calif. 91722
Continuation of application Ser. No. 404,789, Oct. 19, 1964. This application May 3, 1968, Ser. No. 726,604
Int. Cl. E04h *6/34;* B65g *1/04, 37/00*
U.S. Cl. 214—16.1                 5 Claims

ABSTRACT OF THE DISCLOSURE

A parking system with a rectangular plot defining a tortuous path therein with an array of rectangular units spaces disposed along said path, a plurality of rectangular pallets movable along the path in said spaces and adapted to carry an automobile thereon, the number of unit of spaces being one less than the number of pallets, means for moving the pallets in a step-by-step fashion that includes a plurality of extensible and retractable actuators periodically engageable with the pallets, the longitudinal axes of the actuators being inclined and at least a portion of some of said axes being vertically spaced from each other.

---

This is a continuation of Ser. No. 404,789 filed Oct. 19, 1964, now abandoned.

This invention relates generally to a system for the reception, storage and delivery of articles, and is particularly adapted for use in parking automobiles where high land values make it desirable to maximize the number of automobiles which can be parked in a given area.

The preferred form of the invention hereinafter described and illustrated in detail is adapted for use on a generally rectangular storage plot, such as may exist in front or in rear of a building such as an apartment house, commercial establishment or the like. The structure of the present invention provides, in such a storage plot, an array of identical rectangular storage unit spaces arranged in two sets of mutually perpendicular lines including a set of parallel rows and a set of parallel columns perpendicular to the rows. Each unit space may desirably have a length approximately twice its width, and a carrier or pallet preferably in the form of a steel plate is provided in each of the unit spaces except one. The structure moreover includes track means by which the pallets may be moved rectilinearly in a row or column, and guide means are provided in the form of upstanding guide rails for insuring that pallets follow the predetermined path in their movement throughout the array. Each pallet is in abuttable contact with an adjacent pallet in the same row or column. Means are provided for moving one or more pallets in a row or column by engagement with the rearmost pallet in the row or column to be moved. The movement around the array is accomplished in a step-by-step manner, whereby each such movement causes one pallet to occupy the unit space which had immediately prior to the movement been empty.

A particular feature of the system in accordance with the present invention is the provision of a tortuous section in the movement path. In the presently illustrated exemplary embodiment of the invention there is one such tortuous section included in the movement path, but it will be evident that as many more may be included as the size of the array permits.

Specifically, each tortuous section provides a generally U-shaped movement path extending inwardly from an outermost line and returning to that line in a series of three successive movement steps. The first step moves one or more pallets in a line perpendicular to the outermost line inwardly through a distance of one pallet length or width, as the case may be. The second step moves a single pallet through a distance equal to the other pallet dimension, thus transfering the pallet from one line to the adjacent line. The third step moves one or more pallets in the last named line through a distance of the pallet dimension first referred to toward the outermost line from which the three step movement began.

As will be understood, the provision of one or more tortuous sections in the movement path provides a system wherein only a single empty unit space exists in the entire array, regardless of the number of columns of pallets in the system. The invention is thus advantageous where the number of columns is three or more. In the preferred form of the invention, one row, which may be designated the front row, is immediately adjacent an access apron or enlarged driveway, so that the automobile on each pallet in the front row is in immediately available relation to the apron. Moreover, the provision of a number of columns of three or more permits rapid loading of automobiles on the pallets during rush periods, when a number of automobiles arrive to be parked almost simultaneously. This advantageous characteristic of the invention is enhanced by the abutting relationship of the pallets in the array. Thus, as will be understood by reference to the drawings and the subsequent detailed description, the columns extend the entire depth of the storage plot, and since the pallets therein are in end-to-end abutting relationship, an automobile may be driven as far inwardly of the array as there are unoccupied pallets when being parked.

It is accordingly a principal object of the present invention to provide a storage and retrieval system employing a novel movement path, the system being advantageously adapted for parking of automobiles. Other objects of the invention are to provide a system of the above character employing a plurality of movable pallets of identical size arranged in rows and columns in a rectangular array, including means for moving pallets in a path including a tortuous section, generally U-shaped as seen in plan, whereby to maximize the use of the area of the plot on which the present system is located; to disclose such a system employing support track means on which the pallets of the system are rectilinearly movable; and for other and additional objects and purposes as will be understood from a reading of the following description of a preferred embodiment of the invention, taken in connection with the accompanying drawings, in which:

FIG. 1 is a plan view of a rectangular storage plot in which the system of the present invention is disclosed, the front row of pallets in the system having access to an adjacent apron or enlarged driveway communicating wtih a street.

FIG. 2 is a plan view of the system, on a scale larger than that of FIG. 1, with pallets removed in order to show the construction therebeneath.

FIG. 3 is a sectional view taken on line III—III of FIG. 2, with a pallet in position before being moved during part of the movement in the tortuous section.

FIG. 4 is a sectional view similar to FIG. 3, showing the pallet thereof moved to its new position after a movement step.

FIG. 5 is a sectional view taken on line V—V of FIG. 2.

FIG. 6 is a sectional view on an enlarged scale taken on line VI—VI of FIG. 2.

FIG. 7 is a sectional view taken on line VII—VII of FIG. 3.

FIG. 8 is a diagrammatic representation illustrating an array including two tortuous sections in a system in accordance with the invention.

In FIG. 1 a system in accordance with the invention is shown as occupying a generally rectangular storage plot constituting an array indicated generally at 10 providing access at its front end to an apron or enlarged driveway 12 in communication with a street, alley, or the like indicated generally at 14. In the embodiment shown in FIG. 1, there are provided four parallel columns extending generally perpendicular to the street 14, and four rows extending generally parallel to the street 14 and successively spaced therefrom. Thus the array 10 provides a total of sixteen identical rectangular storage unit spaces, each having a length substantially twice its width, and it is contemplated by the present invention that all such spaces except one shall be occupied by a carrier or pallet rectangular in shape and having a flat upper surface on which to receive an automobile to be parked in the system.

There are thus fifteen such pallets in the illustrated system, lettered A through O as shown in FIG. 1. For rapid reception of automobiles to be parked in accordance with the present system, the first to arrive of such automobiles may be driven directly to pallet A, and successively arriving automobiles may then be parked on pallets in successive alphabetic sequence. Under these conditions, at any time after pallets A, B, and C are thus occupied, those three pallets may be moved rightwardly as seen in FIG. 1 by suitable means in accordance with the invention such as those to be later described, thereby leaving empty the upper left unit space as seen in FIG. 1. Thus pallets D, E, and F will be aligned in the outermost left column, and these three pallets, whether or not bearing automobiles parked thereon, may be moved one pallet length rearwardly, thereby leaving the empty unit space at the lower left corner of the array.

In similar manner the three pallets G, H and I then remaining in the front row are moved one pallet width leftwardly, leaving the empty unit space in the lower right corner of the plot. Immediately thereafter, the pallet J is moved frontwardly, or downwardly as seen in FIG. 1, into the formerly empty space at the lower right corner of the plot.

In similar manner, the pallets are moved in successive discrete steps, one space per step, throughout the system, and it will be noted that the empty unit space migrates in the direction opposite to that of pallet movement.

The section of the system array including the spaces occupied by pallets J, K, L, M, N and O as seen in FIG. 1 constitutes a tortuous section characteristic of the present invention which provides important advantages in economy of use of the available spaces for their intended parking purposes. This section is generally U-shaped, and pallets move therethrough in a direction indicated by arrows 20, 21 and 22. Thus, continuing the step movement of pallets after pallet J has been moved frontwardly as just described, the pallets L and K are moved one pallet width rightwardly in accordance with arrow 20, leaving empty the space formerly occupied by pallet L. Pallet M is then moved one pallet length frontwardly as indicated by arrow 21, leaving its former unit space empty. Pallets N and O are then moved one pallet width leftwardly as indicated by arrow 22, leaving the unit space formerly occupied by pallet O empty. Since pallet A is now in the upper right unit space as seen in FIG. 1, it may be moved one pallet length frontwardly, leaving unoccupied the unit space in the upper right corner of FIG. 1.

The construction of a preferred form of the invention will be further understood in reference to FIG. 2. With reference first to the outermost column adjacent the left boundary of the array as seen in FIG. 2, there are provided track means including a pair of parallel tracks 30 and 32. Track 30 extends the entire length of the plot, while track 32 terminates at interruptions 33 and 34 for reasons later appearing, there being provided short track extensions 35 and 36 in alignment with track 32 and spaced from the ends thereof. Across the rear of the array there is a continuous track 40 extending the entire width of the plot, and parallel thereto is track 42 extending rightwardly from its juncture with track 32, and joining at its right end with track section 54. Track 40 joins at its right end a longitudinal track 50, which extends along a portion of the right side of the plot. Track sections 52, 54 and 56 are parallel to track 50, and track sections 52 and 54 are longitudinally spaced apart to provide an interruption 55 therebetween in lateral alignment wtih interruption 34 previously referred to.

The U-shaped tortuous section includes and is principally bounded by tracks 60, 62 and 64, tracks 60 and 64 being parallel and forming effectively the arms of the U, while track 62 forms the base of the U, joining tracks 60 and 64. In the upper or rear portion of the tortuous section there is provided a track 66 parallel to and spaced from track 60, and extending leftwardly from tracks 50 and 56 as shown. Between the spaced ends of track sections 54 and 56 there is an interruption 67 and aligned therewith a similar interruption 68 is provided between track section 70 projecting frontwardly from track 60 and track 72, which is longitudinally aligned with track 70 and joins the left end of track 66. At its front end, track 72 is spaced from rearwardly projecting track section 74 by an interruption 76. Extending rightwardly from track 72, and immediately forwardly of track 66 is a track 80, joining at its right end a longitudinal track 82, and being provided with a forwardly extending track section 84 projecting from track 80. A track 86 is provided in longitudinal alignment with track 54 previously referred to, the rear end of track 86 being spaced from the forward end of track section 84 by an interruption 88.

In the front of the array extending laterally the entire width thereof is a track 90, joining at its left end track 30 previously referred to and at its right end track 82. Rearwardly thereof and parallel thereto is a track 92, extending laterally between track 32 and track 86. The forward end of track 86 is spaced from the rear end of track section 94, the latter projecting rearwardly from track 90 and forming an interruption 96 between its rear end and the forward end of track 86.

Guide means are provided in association with the components just described for defining the movement path of pallets around the array of the system. The preferred form of guide means includes a rail extending upwardly from the upper surface of its adjacent track, the several rails defining channels through which the pallets move in the step-by-step movement previously described. Thus along the left boundary of the plot and fixed to the outer edge of track 30 is a rail 100, extending the entire length of the plot; a similar rail 102 extends the entire width of the plot across the rear thereof, along the rear edge of track 40. Similarly a rail 104 extends along the right edge of tracks 50 and 82 over the entire length of the plot; and a front rail 106 similarly extends the entire width of the plot along the front edge of track 90.

In addition to the boundary rails just mentioned, guide means in the form of rails are provided to define the movement path through the tortuous section previously referred to. These include rail 110, extending upwardly from the otherwise contiguous tracks 42 and 60; rail 112 extending upwardly from the otherwise contiguous tracks 32 and 62; rail 114 extending upwardly frrom the otherwise contiguous tracks 64 and 92; and rail 116 extending upwardly from the otherwise contiguous tracks 66 and 80.

The guide rails are made of a strong rigid material such as steel, and they may be fixed to their adjacent tracks in any suitable manner. An exemplary form is shown in FIG. 6, where guide rail 112 is fixed between tracks 32 and 62. Specifically, track 32 may be in the form of steel channel beam including spaced parallel side sections 120 and 122 and a base section 124 extending therebetween. Similarly track 62 is in the form of a steel channel beam, including spaced sides 130 and 132 and base section 134 extending therebetween. The tracks and guide rail are held in assembled relation as shown by fastening means such as indicated at 136, it being understood that a plurality of such fastening means may be provided, spaced longitudinally along the respective beams and plates.

Although it is contemplated in most instances that the pallets may be slid along the upper surfaces of the beams constituting the tracks in accordance with the invention, desirably with a suitable lubricant applied to the sliding surfaces, nevertheless it may be preferred to diminish the friction between the sliding surfaces by the provision of anti-friction means. One form of such anti-friction means is shown in FIG. 6, including a hardened steel ball 140 received in a socket 142 formed in the upper surface of the base portion 124 of the beam, the mounting being such that the ball projects partially above the upper surface of the beam and is thereby placed in rolling contact with the lower face of the pallet movably supported on the beam. A similar construction is formed in base 134 of track 62, and such socketed balls may be spaced longitudinally along all the tracks. Other forms of anti-friction means may be employed, such as inverted omni-directional casters swivelly mountable in the tracks.

A preferred form of actuator means for movement of the pallets is shown in FIGS. 3 and 4, respectively showing an actuator and pallet moved thereby before and after such movement. A pallet indicated generally at 150 (which may be any of the pallets alphabetically identified in connection with FIG. 1) is made of rigid material such as steel plate having a smooth upper surface 152 and on its lower otherwise flat surface there is a downwardly projecting generally rectangular boss indicated generally at 154.

A longitudinally actuator indicated generally at 160 includes an elongated cylinder indicated generally at 162 having an elongated piston rod projecting therefrom and indicated generally at 164. Cylinder 162 is desirably mounted with its axis slightly inclined to the horizontal as shown, to avoid interference with the rod of an adjacent actuator, and its lower end may be fixed by suitable means 166 to the foundation. A conduit 168 supplies pressure fluid to, or bleeds fluid from, the cylinder in known manner.

As seen in FIG. 4, within cylinder 162 piston rod 164 terminates in an enlarged piston head 170, desirably biased rightwardly by resilient means within the cylinder, here shown as a compression spring 172. Thus with no pressure fluid in the cylinder, the piston head and rod assume their extended or rest position seen in FIG. 3. The outermost end of piston rod 164 is provided with an upstanding stud 174 which is abuttingly engageable with boss 154 of the pallet when pressure fluid is supplied to the cylinder for moving the parts to the FIG. 4 position. The boss 154 is desirably configured to provide vertically extending recesses 156 (see FIG. 7) into one of which the actuator stud is received to insure the stud-boss engagement.

As will be seen in FIG. 5, arrival of pallet 150 in its position of FIG. 4 places boss 154 in alignment with upstanding stud 274 at the outer end of piston rod 264 slidably received in cylinder 262 of lateral actuator indicated generally at 260, fixed at 266 to the foundation. Thus, pressure fluid in conduit 268 will cause actuator 260 to move pallet 150 rightwardy one pallet width as seen in FIG. 5, and pallet 250 similarly moves rightwardly by reason of the abutment of pallet 150 thereagainst. Additional actuators are provided for accomplishing the movement described in FIG. 1, including longitudinal actuators (see FIG. 2) 180, 182 and 184 and lateral actuators 280, 282 and 284. It will be seen that the provision of the interruptions previously described permit the downwardly projecting boss of each pallet to pass through the interruptions, the latter being disposed centrally of the movement path for this purpose. The pallets may be provided with peripheral snubbing strips of resilient material, as best seen at 158 in FIG. 6, to minimize mechanical shock during pallet movement.

In FIG. 8 is diagrammatically shown a modified form of the invention, illustrating its adaptability to storage plots having dimensions varying over wide ranges. Thus, the array 300 contemplates step-by-step pallet movement in the direction of the arrows, and it is particularly to be noted that two tortuous sections are provided. Thus, one such section along the rear boundary of the array is indicated generally at 302, and another is indicated generally at 304 along a side boundary of the array.

It will further be noted that provision of one or more tortuous sections as above described facilitates retrieval of a particular automobile from the array. Thus each tortuous section serves in effect to shift a pallet and the automobile stored thereon either from one column to an adjacent column or from one row to an adjacent row. Hence with a limited number of pallet movements, and keeping in mind that an automobile may be driven from pallet to pallet through the array, a desired automobile may be brought to a position permitting access to the front of the array.

Although each rectangular pallet has been shown as having a length substantially twice its width, to accommodate one automobile on each pallet, nevertheless it is possible that for some installations square pallets might be used, with corresponding changes in the sizes and spacings of tracks and guide rails, each such square pallet receiving two automobiles in side-by-side relation.

Modifications and changes not substantially departing from the illustrative forms of the invention herein disclosed are intended to be embraced within the scope of the appended claims.

I claim:

1. In an automobile parking system including a rectangular plot providing an array of identical rectangular unit spaces arranged in lines comprising a set of parallel rows and a set of parallel columns perpendicular to the rows, a plurality of identical rectangular pallets, each adapted to carry an automobile thereon and receivable in one of the spaces and movable rectilinearly along the lines of the array, the number of unit spaces being one greater than the number of pallets, whereby one of the unit spaces is empty, and means including spaced parallel horizontal tracks for movably supporting pallets thereon, the provision of:

means for moving the pallets in step-by-step fashion through the spaces in a tortuous path, including a plurality of longitudinally extensible and retractable actuators each being abuttingly engageable with a pallet at the actuator outermost end, the axes of first and second groups of actuators, as viewed in plan, being parallel to the rows and columns respectively, and the strokes of the actuators of the first and second groups being at least as long as the width and length respectively of a space, the actuator axes being inclined downwardly from their outermost ends, and at least a portion of some of said axes being vertically spaced from each other.

2. The invention as stated in claim 1 wherein each pallet is provided with a centrally disposed stud projecting downwardly between said tracks and abuttable by an actuator outermost end.

3. The invention as stated in claim 2 wherein the outermost end of each actuator includes an upstanding portion abuttingly engageable with a stud, whereby retracting actuator movement causes pallet movement.

4. The invention as stated in claim 1 wherein one of said sets includes at least three members and the other set includes an even number of members, at least four.

5. The invention as stated in claim 4 wherein said tortuous path includes a section wherein a pallet first moves along a line from one boundary of the array toward the opposite boundary, secondly moves at least one space along a line spaced from said opposite boundary and parallel thereto, and thirdly moves along a line parallel to, and through the same distance as, the line of first movement, but in the direction opposite thereto.

References Cited

UNITED STATES PATENTS

| | | | |
|---|---|---|---|
| 2,722,322 | 11/1955 | Gunderson | 214—16.1 |
| 2,837,224 | 6/1958 | Rosen | 214—16.1 |
| 2,903,120 | 9/1959 | Thomas | 214—16.1 |

FOREIGN PATENTS 689,075  3/1953  Great Britain.

GERALD M. FORLENZA, *Primary Examiner.*

RAYMOND B. JOHNSON, *Assistant Examiner.*

U.S. Cl. X.R.

198—85